UNITED STATES PATENT OFFICE.

CHARLES TOPPAN, OF SALEM, MASSACHUSETTS, ASSIGNOR OF TWO-THIRDS TO GEORGE F. SENTER, OF NEW YORK, N. Y.

PAINT.

SPECIFICATION forming part of Letters Patent No. 272,102, dated February 13, 1883.

Application filed October 3, 1881. (Specimens.)

*To all whom it may concern:*

Be it known that I, CHARLES TOPPAN, of Salem, in the county of Essex and State of Massachusetts, have invented a new and useful Improvement in Paints; and I do hereby declare that the following is a full and clear description thereof.

I use as a base for forming this compound a composition of matter consisting of a mixture of the expressed oil of mustard-seed with petroleum or other mineral oils, as secured to me by Letters Patent No. 186,640, of January 23, 1877. This base compound has a specific gravity of 10° by oilkometer with temperature at 100° Fahrenheit. Its boiling-point is 190° Fahrenheit. The freezing-point has not been determined, but is lower than 17° Fahrenheit. This base I also use for several other compounds, among which are a "leather-black" and an "indelible ink," for which I make simultaneous applications with the present. The proportions in which these two ingredients or elements of the compound are mixed may be somewhat varied; but I prefer to use about two parts of the base to one part of the other material, as I have found these proportions to work best. In this compound the dry sulphate of iron must be finely powdered and the whole mass allowed to stand long enough to become thoroughly incorporated. The treatment of this compound is as follows: After the compound has stood long enough to become a semi-fluid or pasty mass of a black color, I grind the said compound in an ordinary paint-mill into a fine, smooth, and homogeneous paste, or rather thick fluid. To make any desired color I grind into this prepared compound or fluid any desired pigment or coloring-matter. I find a very small percentage of color is all that is required to produce any shade of paint, which will remain unfading for any length of time. When the paint is ready for use, I add a small quantity of spirits of turpentine, with any suitable drier, if occasion requires it, and these will be mixed into the paint in the usual way. I have found that this kind of paint will unite readily with any metallic or mineral substance, and that applied to any wood or metal surface will form a durable coating thereon, which said coating will be impervious to water or moisture, and will be proof against the attack of or accumulation thereon of any fungus growth, even when placed in or near salt-water or subjected to alternate wet and dry conditions.

The materials herein mentioned, or some of them, are also employed by me for the production of other compounds—such as the manufacture of indelible ink and leather-black—for which I have made applications of even date herewith for Letters Patent; but each of these specific inventions requires different proportions of the ingredients or different methods of fabrication, as is fully set forth in each specific specification.

Having described my invention, I claim—

As a new composition of matter for a paint, a mixture of the base material herein described, consisting of a compound of the oil of mustard-seed and mineral oil, with the dry sulphate of iron, compounded substantially as described.

CHARLES TOPPAN.

Witnesses:
M. RANDOLPH,
J. B. THURSTON.